United States Patent [19]

Landgrebe

[11] Patent Number: 5,493,874
[45] Date of Patent: Feb. 27, 1996

[54] COMPARTMENTED HEATING AND COOLING CHEST

[76] Inventor: Mark A. Landgrebe, 19 Hibben Pl., Upper Montclair, N.J. 07043

[21] Appl. No.: 208,215

[22] Filed: Mar. 10, 1994

[51] Int. Cl.⁶ .................................................. F25D 3/08
[52] U.S. Cl. ........................... 62/457.2; 62/371; 62/457.7; 62/263
[58] Field of Search ................................. 62/457.1, 457.2, 62/457.7, 457.9, 371, 372; 165/48.1, 61, 918, 919; 126/263 R, 26 A, 263 B, 263 C, 263 D, 263 DA, 263 DB, 263 DC, 263 DD, 263 E

[56] References Cited

U.S. PATENT DOCUMENTS

| | | | |
|---|---|---|---|
| 1,979,222 | 10/1934 | Goodwin | 165/918 |
| 4,949,702 | 8/1990 | Suzuki et al. | 126/263 |
| 5,315,084 | 5/1994 | Jensen | 165/61 |

*Primary Examiner*—John M. Sollecito
*Attorney, Agent, or Firm*—Terrance L. Siemens

[57] ABSTRACT

A portable, insulated carrying chest having both hot and cold compartments. Two separate, insulated compartments are provided within a receptacle. Each compartment has its own cover, so that when one compartment is opened, the other is not disturbed, and heat transfer therebetween is minimized. One compartment has a chilling medium, such as a commercially available frozen, enclosed medium. The other compartment has a heating medium, such as a commercially available heating pack comprising a material which emits heat spontaneously upon being exposed to air. Metal carriers are provided for holding two such heating packs against opposing walls of the hot compartment.

2 Claims, 1 Drawing Sheet

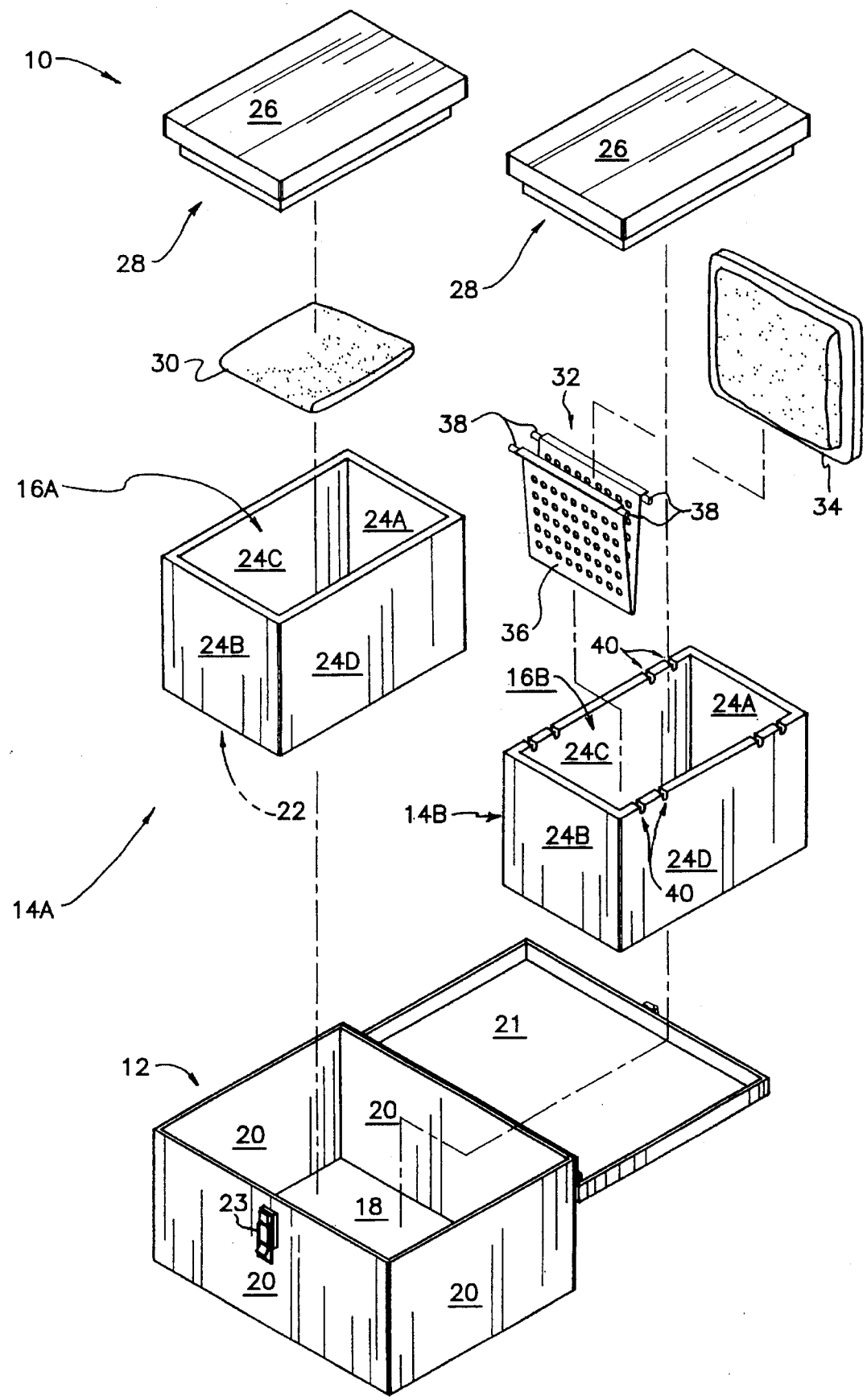

COMPARTMENTED HEATING AND COOLING CHEST

BACKGROUND OF THE INVENTION

1. Field of the Invention

The present invention relates to a compartmented and insulated food storage container, including heated and chilled compartments. Both heated and chilled foods may be contained therein, and their respective disparate temperatures are maintained simultaneously.

2. Description of the Prior Art

It has long been the goal of the prior art to store in a container foods which must be preserved by chilling, and other foods which must be heated.

U.S. Pat. No. 4,286,440, issued to Frank Taylor on Sep. 1, 1981, describes a portable cooler for holding at least two classes of chilled comestibles. The cooler is built so as to describe separate storage chambers which are separated when a chilled medium is set in place. The walls of one or both chambers accommodate the chilled medium, which is preferably a solid walled receptacle containing ice or a similar medium which has previously been considerably chilled. The receptacles form a final wall separating one chilled chamber from another. The purpose of this arrangement is to maintain a first comestible at a lower temperature than a comestible stored in the second chamber. In an example, beverages are maintained at about 40 degrees Fahrenheit, and wrapped sandwiches are maintained at 60 degrees Fahrenheit.

A compartmented lunch box is seen in U.S. Pat. No. 5,181,612, issued to Yuan W. Liu on Jan. 26, 1993. The interior of the basically cubical or rectangular box is partitioned into two chambers. A wall is placed within the cubical or rectangular storage chamber at a selectively variable point therein, the wall being parallel to the end walls of the box. The resultant subchambers thus share two dimensions. The third dimension may differ or be equal. Both subchambers are accessible from the top.

A highly insulated carrying box is disclosed in U.S. Pat. No. 5,040,678, issued to Voigt O. Lenmark, Sr., et al. on Aug. 20, 1991. The receptacle is virtually filled with blocks of expanded foam or like materials. Spaces between adjacent blocks accommodate specimen vials. A chilled medium is also carried within the box. The vials are both protected from shock and insulated by the blocks. Mechanical protection is a primary objective of this invention, and economy of space is not important.

U.S. Pat. No. 4,974,426, issued to Sergio G. Gomez on Dec. 4, 1990, discloses a portable cooler primarily intended to transfer heat from a plurality of beverage containers, such as metal cylindrical cans, as efficiently as possible. The cooler includes a structure devoted to holding beverage containers for quick dispensing, and for promoting flow of water from melted ice stored within the cooler to these beverage containers. Although internal walls are shown inside the ice chamber, these internal walls hold cans in a preferred orientation, and do not subdivide the ice chamber into separated subchambers.

An insert system for a portable cooler is disclosed in U.S. Pat. No. 4,916,923, issued to Carol A. Adams et al. on Apr. 17, 1990. The insert holds a predetermined number of beverage containers upright within the cooler, and does not subdivide the cooler main chamber into separated subchambers.

A preferred heating medium is shown in U.S. Pat. No. 3,976,049, which is hereby incorporated by reference. The medium comprises iron, water, cellulose, vermiculite, activated carbon, and salt. In a commercially available form distributed by the Grabber Company, 205 Mason Circle, Concord, Calif., the contents are provided as a granular solid contained within a paper envelope. When a surrounding air impermeable wrapper is opened, an exothermic process proceeds, and the heating medium emits heat for at least twelve hours.

None of the above inventions and patents, taken either singly or in combination, is seen to describe the instant invention as claimed.

SUMMARY OF THE INVENTION

The present invention comprises a portable chest of the cooler type. That is to say, it is insulated in the same way as chests typically employed to contain comestibles and a chilling medium. However, the instant portable, insulated carrying chest is intended both to warm and cool its contents, and furthermore accomplishes both tasks simultaneously.

To this end, the chest includes two separate insulated chambers, each having its own cover so as to avoid subjecting one to ambient air when the other is opened. Separate chilling and heating media are provided, and are of commonly available types, of compact form.

The chest is further provided with insertable trays configured and dimensioned to hold certain commonly employed receptacles in constant position. Additional space is provided by the insertable trays for holding accessories, ingestible objects, and other paraphernalia.

Accordingly, it is a principle object of the invention to provide an insulated, portable chest which both heats and chills its contents.

It is another object of the invention to provide an insulated, portable chest having separated heated and chilled compartments, so that contents may be heated and chilled simultaneously.

It is a further object of the invention to provide a plurality of separable enclosures providing respective heated and chilled compartments.

It is an additional object of the invention to provide readily installed and operative heating and chilling media.

It is again an object of the invention to provide a holder for holding commercially available packets or envelopes of heating media.

Finally, it is a general goal of the invention to provide improved elements and arrangements thereof in an apparatus for the purposes described which is inexpensive, dependable and fully effective in accomplishing its intended purposes.

The present invention meets or exceeds all the above objects and goals. Upon further study of the specification and appended claims, further objects and advantages of this invention will become apparent to those skilled in the art.

These and other objects of the present invention will become readily apparent upon further review of the following specification and drawing.

BRIEF DESCRIPTION OF THE DRAWING

Various other objects, features, and attendant advantages of the present invention will become more fully appreciated as the same becomes better understood when considered in conjunction with the accompanying drawing wherein:

The drawing Figure is an exploded, perspective view of the novel insulated, portable heating and cooling chest.

DETAILED DESCRIPTION OF THE PREFERRED EMBODIMENTS

The novel, insulated portable heating and cooling chest 10 is seen in the drawing Figure to comprise a receptacle 12 housing two separate enclosures 16A, 16B defining therein two insulated compartments 14. Receptacle 12 is provided with a floor 18 and four upright exterior walls 20. A hinged cover 21 including a latch 23 closes receptacle 12. Each insulated compartment 16A, 16B comprises a floor 22 and four walls 24A, 24B, 24C, 24D dimensioned and configured to fit precisely into receptacle 12, and is upwardly open. Each compartment 16A, 16B has its own cover 26, which has a stepped configuration 28, so that it fits snugly into its respective compartment 16A or 16B, and is retained there by frictional fit. This arrangement including separate covers 26 provides access by a user to one insulated compartment 16A or 16B, while maintaining the other compartment 16B or 16A out of communication therewith, and also out of communication with ambient air.

One compartment 16A is dedicated to chilled storage. A commercially manufactured freezing medium 30 enclosed within a housing impermeable to seepage and escape of the freezing medium is placed in compartment 16A. The other compartment 16B is provided with two carriers 32 each supporting one heating pack 34 containing the heating medium discussed hereinafter. Each heating pack 34 is held against one wall 24A or 24B of compartment 16B.

In preferable form, a carrier 32 comprises a folded, perforated sheet 36 of aluminum having fingers 38 projecting therefrom. Fingers engage cooperating slots 40 formed in opposing walls 24C, 24D of compartment 16B. A heating pack 34 is thus readily placed into position, sandwiched between walls 24C, 24D of carrier 32, and is readily removed therefrom. The envelope of heating pack 34 is placed in a carrier 32 at the last moment, and heating proceeds immediately and spontaneously.

Chilling medium 30 may be any convenient chilled medium. Ice will serve in some applications. A commercially produced package of a frozen medium of well known type is preferred, as it is commercially available and it will not release a liquid to its environment as it warms, as will occur with ice.

The heating medium contained within heating pack 34 is available as a commercial, prepackaged granular solid, as described hereinabove. Heating pack 34 is easily and inexpensively discarded and replaced by another. Heating may be immediately resumed by replacement. Thus both heating and chilling media are readily installed and quickly operative.

It is to be understood that the present invention is not limited to the embodiments described above, but encompasses any and all embodiments within the scope of the following claims.

I claim:

1. A portable, insulated carrying chest for storing, carrying, and maintaining the temperature of both heated and chilled contents, comprising:

a receptacle having a floor and upright exterior walls;

at least two insulated compartments defining open chambers therewithin, prevented from fluid communication with one another and with ambient air, said insulated compartments including separate substantially planar horizontal covers, whereby one of said insulated compartments is isolated from another said insulated compartment when open, and also isolated from ambient air;

a chilled heat absorbing medium located inside a first one of said at least two insulated compartments;

a heated heat emitting medium located in another one of said at least two insulated compartments wherein said heat emitting medium is sealed in an airtight bag and spontaneously emits heat upon exposure to air by perforating said bag;

at least one carrier for holding said heat emitting medium, comprising two perforated carrier walls sandwiching said heat emitting medium bag and means for removably suspending said carrier from cooperating slots formed in opposing walls inside a second one of said at least two insulated compartments of said carrying chest wherein;

said insulated compartments, said heat absorbing means and said heat emitting means defined means to simultaneously maintain a temperature inside said first compartment at a level substantially below a temperature of said ambient air surrounding said chest and a temperature inside said second compartment at a temperature substantially above said temperature of said ambient air and the freedom from any external energy source assures complete portability.

2. The carrying chest according to claim 1, each said separate substantially planar horizontal cover being of stepped configuration, whereby each said cover fits snugly into an associated said compartment, and is held therein by frictional fit.

\* \* \* \* \*